US008394882B2

(12) United States Patent
VonHooks

(10) Patent No.: US 8,394,882 B2
(45) Date of Patent: Mar. 12, 2013

(54) EMULSION POLYMERIZATION OF FLUOROPOLYMERS USING EUROPIUM III CHLORIDE

(76) Inventor: Zancy VonHooks, Jeffersonville, VT (US)

(*) Notice: Subject to any disclaimer, the term of this patent is extended or adjusted under 35 U.S.C. 154(b) by 176 days.

(21) Appl. No.: 13/053,773

(22) Filed: Mar. 22, 2011

(65) Prior Publication Data

US 2011/0230636 A1 Sep. 22, 2011

Related U.S. Application Data

(60) Provisional application No. 61/340,683, filed on Mar. 22, 2010.

(51) Int. Cl.
*C08J 3/03* (2006.01)
*C08K 5/02* (2006.01)
*C08J 3/00* (2006.01)
*C08K 5/00* (2006.01)

(52) U.S. Cl. ........ 524/463; 524/457; 524/544; 524/567; 524/801; 524/805; 528/401; 528/482

(58) Field of Classification Search .................. 524/463, 524/457, 544, 567, 801, 805; 528/401, 482
See application file for complete search history.

(56) References Cited

U.S. PATENT DOCUMENTS 7,834,137 B2 11/2010 Higuchi et al.
7,838,608 B2 11/2010 Hintzer et al.
7,851,573 B2 12/2010 Higuchi et al.

OTHER PUBLICATIONS

Ziegler-Natta catalyst. Printed Jun. 21, 2011. http://en.wikipedia.org/wiki/Ziegler-Natta. 5 pages.
Luis A. Gallardo MS, Europium Stearate Additives Delay Oxidation of UHMWPE for Orthopaedic Applications: A Pilot Study, symposium, Dec. 2010, 2 pages, http://www.clinorthop.org/journal/11999/0/0/1711__10.1007__s11999-010-1711-z/2010/Eur . . . .
New Dyneon Emulsifier Eliminates APFO from Production of Fluoropolymers, Albawaba.com, Jan. 3, 2009, http://www.thefreelibrary.com/New+Dyneon+Emulsifier+Eliminates+APF0+from+Produ . . . , 1 page.
Sophie Laurent, et al., Magnetic Iron Oxide Nanoparticles: Synthesis, Stabilization, Vectorization, Physicochemical Characterizations, and Biological Applications, Chemical Reviews, 2008, vol. 108, pp. 2064-2110.
Karen Deleersnyder, Lanthanide-mediated organic synthesis, Faculteit Wetenschappen, Departement Chemie, 2007, pp. 53-119.
Koen Binnemans, Lanthanides and Actinides in Ionic Liquids, Chemical Reviews, Aug. 1, 2006, vol. 107, pp. 2592-2614.
Shijie Ding, et al., Magnetic Nanoparticle Supported Catalyst for Atom Transfer Radical Polymerization, Macromolecules, 2006, vol. 39, pp. 6399-6405.
Ercules E.S. Teotonio, Synthesis and luminescent properties of Eu3+-complexes with 2-acyl-1, 3-indandionates (ACIND) and TPPO ligands, Science Direct, 2006, pp. 3488-3494.
A.J.M. Valente, et al., Effect of Europium(III) Chloride on the Aggregation Behavior of Sodium Dodecyl Sulfate, Langmuir, 2006, vol. 22, pp. 5625-5629.
Feixiong Hu, et al., Cellular Response to Magnetic Nanoparticles, "PEGylated" via Surface-Initiated Atom Transfer Radical Polymerization, Biomacromolecules, 2006, vol. 7, pp. 809-816.
Seung-Gu Lee, et al., The geochemical implication of a variable Eu anomaly in a fractured gneiss core: application for understanding Am behavior in the geological environment, Applied Geochemistry, 2004, vol. 19, pp. 1711-1725.
Final Report, U.S. Department of Energy, Micelle formation and Surface Interactions in Supercritical CO2., Project ID No. 64865, Project Duration Oct. 1998-Sep. 2001, 21 pages.
H. Neil Gray, et al., Applications of Polymeric Smart Materials to Environmental Problems, Environmental Health Perspectives, Feb. 1997, vol. 105, pp. 55-63.
David Long Price, et al., Structure of Liquid Trivalent Salts, Apr. 1993, 10 pages.
Hajimu Yamana, Systematic Characteristics of Lanthanides and Actinides Under Pyrochemical and Aqueous Conditions, Booklet of Nuclear Recycle Chemistry Group, Research Reactor Institute, Kyoto University, pp. 1-9.
Teflon: How Products are Made. Printed Jun. 21, 2011. http://www.enotes.com/how-products-encyclopedia/teflon/ print.
Dr. Richard F.W. Bader, An Introduction to the Electronic Structure of Atoms and Molecules, printed Jun. 21, 2011, http://www.chemistry.mcmaster.ca/esam/Chapter_5/section_1.html.
PFOS: Perfluoroctane sulfonate and PFOA: Perfluorooctanoic acid Per-fluorinated chemicals, Fluoride Action Network Pesticide Project, printed Jun. 21, 2011, 12 pages.
Oleg Lukanin, Abnormal Eu behavior at formation of H2O- and Cl-bearing fluids during degassing of granite magmas, Geophysical Research Abstracts, 2010, vol. 12, 1 page.

*Primary Examiner* — Duc Truong
(74) *Attorney, Agent, or Firm* — Price Heneveld LLP

(57) ABSTRACT

An improved process for emulsion polymerization of fluoropolymers, such as polytetrafluoroethylene, employs reduced amounts of fluorinated emulsifiers. The addition of europium III chloride facilitates emulsion polymerization of fluoropolymers having comparable quality to those fluoropolymers made using conventional processes employing greater amounts of environmentally undesirable fluorinated emulsifiers.

2 Claims, No Drawings

EMULSION POLYMERIZATION OF FLUOROPOLYMERS USING EUROPIUM III CHLORIDE

CROSS REFERENCE TO RELATED APPLICATION

This application claims benefit under 35 USC §119(e) of provisional application Ser. No. 61/340,683, filed Mar. 22, 2010, entitled "Zet formula," the entire contents of which are incorporated herein by reference.

FIELD OF THE INVENTION

This invention relates to emulsion polymerization of fluorinated monomers to produce fluoropolymers, such as polytetrafluoroethylene (PTFE), using reduced levels of fluorinated emulsifiers, such as perfluorooctanoic acid (PFOA) and/or its salts.

BACKGROUND OF THE INVENTION

PTFE and other fluoropolymers are most commonly commercially produced by emulsion polymerization. Emulsion polymerization provides a better balance of economy, quality, environmental friendliness, and minimal health risks. However, it is believed that commercially suitable emulsion polymerization processes for making fluoropolymers require a fluorinated emulsifier, such as PFOA and/or a salt of PFOA.

Until fairly recently, it was believed that PFOA and its salts were the only suitable emulsifiers that could be used to achieve acceptable yields and product quality during emulsion polymerization of fluorinated monomers to produce PTFE and other fluoropolymers. However, it has been reported that PFOA and its salts are very persistent in the environment, and have been found in the blood of the general population of the United States. It has also been found that PFOA and its salts cause developmental and other adverse affects in laboratory animals. It is believed that PTFE products and other fluoropolymer products may contain trace amounts of PFOA and/or other related perfluoronated chemicals as impurities.

Because of the environmental concerns and potential health risks associated with the use of PFOA and/or its salts, in 2006 the United States Environmental Protection Agency and eight major manufacturers of fluoropolymers launched the 2010/15 PFOA Stewardship Program, in which the manufacturers have committed to reduce facility emissions and product content of PFOA and related chemicals by 95% by 2010, and to work toward eliminating emissions and product content by 2015.

Examples of new emulsion polymerization processes for making fluoropolymers using reduced amounts of PFOA and/ or its salts are described in the literature. U.S. Pat. No. 7,851, 573 to Higuchi et al. describes an aqueous emulsion polymerization process which employs a polyfluoroethylene oxide carboxylate as a substitute for PFOA. The entire content of U.S. Pat. No. 7,851,573 is hereby incorporated by reference herein. U.S. Pat. No. 7,834,137 to Higuchi et al. describes a process for producing an aqueous fluorinated polymer dispersion having a reduced content of a fluorinated emulsifier by using a weakly basic anion-exchange resin to absorb and remove the fluorinated emulsifier from the emulsion with excellent efficiency. The entire contents of U.S. Pat. No. 7,834,137 is hereby incorporated by reference herein. U.S. Pat. No. 7,838,608 to Hintzer et al. describes an aqueous emulsion polymerization of PTFE employing a fluorinated aliphatic carboxlate surfactant that has at least one carbon atom in the aliphatic group that is not fully fluorinated as a substitute for PFOA and/or its salts.

Dyneon, a 3M Company, has announced its Dyneon ADONA™ emulsifier that is said to completely eliminate the use of ammonium perfluorooctanate (APFO), a salt derived from PFOA, from its fluoropolymer production processes. It has been stated that ADONA™ emulsifier is 10 to 30 times less toxic than APFO in developmental toxicity studies in rodents, and 5 to 17 times less toxic than APFO in 28-day oral toxicity studies in rats.

Perfluorobutanic acid (PFBA) and/or its salts have been proposed as a substitute for PFOA and/or its salts as an emulsifier for polymerization of fluoropolymers.

The approaches that have been explored for reducing or eliminating the use of PFOA and/or its salts have generally focused on either substituting a less toxic fluorinated emulsifier or facilitating removal of the emulsifier from the polymer dispersion after polymerization is completed.

BRIEF SUMMARY OF THE INVENTION

The invention is directed to a process of making fluoropolymers by emulsion polymerization using a reduced level of fluorinated emulsifier by addition of europium III chloride to the emulsion. More specifically, the process of the invention employs an amount of europium III chloride that is effective to achieve product yields and molecular weight distributions that are comparable to conventional processes that do not employ europium III chloride, but while using a reduced level of the fluorinated emulsifier.

These and other features, advantages, and objects of the present invention will be further understood and appreciated by those skilled in the art by reference to the following specification, and claims.

DESCRIPTION OF THE PREFERRED EMBODIMENTS

The invention is not bound to any particular theory. The mechanism by which the addition of europium III chloride reduces the need for fluorinated emulsifier during emulsion polymerization of fluorinated monomers has not been determined with certainty but is believed to involve ionic interactions between the fluorinated emulsifier and europium III chloride. More specifically, it is believed that the europium III chloride strongly interacts with the fluorinated emulsifier to create a stable emulsion which facilitates production of fluoropolymers employing lower levels (concentrations) of fluorinated emulsifiers to achieve a desired product yield and quality.

Europium III chloride is a compound of europium and chloride with the formula $EuCl_3$. Europium III chloride is a hygroscopic yellow solid, which upon exposure to moisture forms a white crystalline hexahydrate ($EuCl_3 \cdot 6H_2O$). Heretofore, europium III chloride had very limited uses, including the preparation of europium (II) chloride, the preparation of europium salts, and the preparation of organometallic compounds such as bis(pentamethylcyclopentadienyl) europium (II) complexes. Europium III chloride is commercially available from a variety of sources.

The fluorinated emulsifiers that may be used at reduced levels in combination with europium III chloride in accordance with the invention include PFOA, and other salts of PFOA, such as alkali metal (e.g., lithium, sodium, potassium, rubidium, cesium and francium) salts and alkaline metal (e.g., beryllium, magnesium, calcium, strontium, barium, and radium) salts, other perfluoronated carboxylic acids such as PFBA, polyfluoroethylene oxide carboxylates, such as those described in U.S. Pat. No. 7,851,573, fluorinated aliphatic carboxylate surfactants, such as those described in U.S. Pat. No. 7,838,608, and other fluorinated emulsifiers, such as ammonium 4,8-dioxa-3H-perfluorononanoate. Also, various combinations of fluorinated emulsifiers may be used at reduced levels in combination with europium III chloride in accordance with certain embodiments of the invention.

Fluorinated monomers that may be polymerized include partially or fully fluorinated gaseous monomers including fluorinated olefins, such as tetrafluoroethylene (TFE), chlorotrifluoroethylene (CTFE), hexafluoropropylene (HFP), vinyl fluoride (VF), vinylidene fluoride (VDF), partially or fully fluorinated allyl ethers and partially or fully fluorinated vinyl ethers. The polymerization may also include non-fluorinated monomers, such as ethylene and propylene. Examples of other monomers that may be included are perfluoro (2,2-dimethyl-1,3-dioxole) and perfluoro (4-alkyl-1,3-dioxole). The above mentioned monomers are merely illustrated, and other fluorinated and/or non-fluorinated monomers may be employed.

Initiators known for initiating a free radical polymerization of fluorinated monomers may be employed. Suitable initiators include peroxides and azo compounds and redox based initiators. Examples of peroxide initiators include hydrogen peroxide, sodium or barium peroxide, diacylperoxides such as diacetylperoxide, disuccinylperoxide, dipropionylperoxide, dibutyrylperoxide, dibenzoylperoxide, benzoylacetylperoxide, diglutaric acid peroxide and dilaurylperoxide, as well as per-acids and salts thereof such as ammonium, sodium or potassium salts. Examples of per-acids include peracetic acid. Esters of the peracid can be used as well and examples thereof include tertiary-butylperoxyacetate and tertiary-butylperoxypivalate. Examples of inorganic initiators include ammonium-, alkali-, or alkaline-salts of persulfates, permanganic or manganic acid or manganic acids. Examples of persulfate initiators that may be employed include ammonium persulfate, which can be used alone or in combination with a reducing agent. Suitable reducing agents include bisulfites such as ammonium bisulfite or sodium metabisulfite, thiosulfates such as ammonium, potassium or sodium thiosulfate, hydrazines, azodicarboxylates and azodicarboxyldiamide. Other reducing agents that may be employed include sodium formaldehyde sulfoxylate or fluoroalkyl sulfonates. Additionally, a metal salt catalyst such as, for example, copper, iron or silver salts may be added. The amount of initiator may be from 0.01% to 1% by weight based on the fluoropolymer solids to be produced. In one embodiment, the amount of initiator is between 0.05% and 0.5% by weight based on the fluoropolymer solids to be produced. In another embodiment, the amount may be between 0.05% and 0.3% by weight based on the fluoropolymer solids to be produced.

The aqueous emulsion polymerization system may further comprise other materials, such as buffers and, if desired, complex-formers or chain-transfer agents. Examples of chain-transfer agents that may be used include dimethyl ether, methyl tertiary-butyl ether, alkanes having 1 to 5 carbon atoms such as ethane, propane and n-pentane, halogenated hydrocarbons such as carbon tetrachloride, trichloromethane, dichloromethane, and hydrofluorocarbon compounds such as $CH_2F$—$CF_3$. Additionally, esters such as ethylacetate, or malonic esters may be employed.

The aqueous emulsion polymerization may be carried out at a temperature from about 10° C. to about 150° C. In certain embodiments, the polymerization is carried out at a temperature of from 20° C. to 110° C., and at a pressure between 2 and 30 bar. The reaction temperature may be varied during the polymerization to influence the molecular weight distribution, such as to obtain a broad molecular weight distribution or to obtain an bimodal or multimodal molecular weight distribution.

The pH of the polymerization media may be in the range of from 2 to 11. In certain embodiments, the pH is in the range from 3 to 10, and in other embodiments, the pH is in the range of from 4 to 10.

The amount of fluorinated and/or other monomers employed in the emulsion is sufficient to provide a final fluoropolymer solid content of from about 3% to about 40% based on the weight of the dispersion at the conclusion of the polymerization reaction.

The amount of fluorinated emulsifier employed in the emulsion polymerizations of this invention are typically from about 0.01% to about 5% by weight based on the amount of fluoropolymer solids produced. In certain embodiments, the amount of surfactant is from about 0.01% to 2% or 1% by weight based on the amount of fluoropolymer solids produced.

The amount of europium III chloride employed in the processes of this invention is generally from about 0.01% to about 5% by weight based on the weight of the fluoropolymer produced. In certain embodiments, the amount of europium III chloride is from about 0.01% to 2% or 1% by weight of the fluoropolymer produced. In general, the addition of europium III chloride is in an amount that is effective to substantially reduce the amount of fluorinated emulsifier by 20% to 95% as compared with a conventional polymerization process that does not employ europium III chloride, while achieving a comparable yield and molecular weight distribution. A comparable yield and molecular weight distribution is one in which the product yield is at least 95% of the conventional product yield and the number average molecular weight and weight average molecular weight are within 80% of the molecular weights for a conventional polymerization that does not employ europium III chloride.

The process of this invention may be used in combination with the processes described in U.S. Pat. No. 7,834,137 to achieve enhanced reduction of residual fluorinated emulsifier impurities in fluoropolymer products.

The invention claimed is:

1. A process for making a fluoropolymer, comprising:
preparing an aqueous emulsion comprising at least one fluorinated monomer, a fluorinated emulsifier, and europium III chloride in an amount that is effective to achieve a product yield and molecular weight distribution that is comparable to that of a polymerization process that does not employ europium III chloride, and the process employing a reduced level of fluorinated emulsifier as compared with a polymerization process not employing europium III chloride.

2. An emulsion, comprising at least one fluorinated monomer, a fluorinated emulsifier, and europium III chloride in an amount that is effective to achieve a product yield and molecular weight distribution that is comparable to that of a polymerization process that does not employ europium III chloride, and the process employing a reduced level of fluorinated emulsifier as compared with a polymerization process not employing europium III chloride.

* * * * *